P. PIPER.
FISHING POLE.
APPLICATION FILED MAY 8, 1908.
902,447.
Patented Oct. 27, 1908.
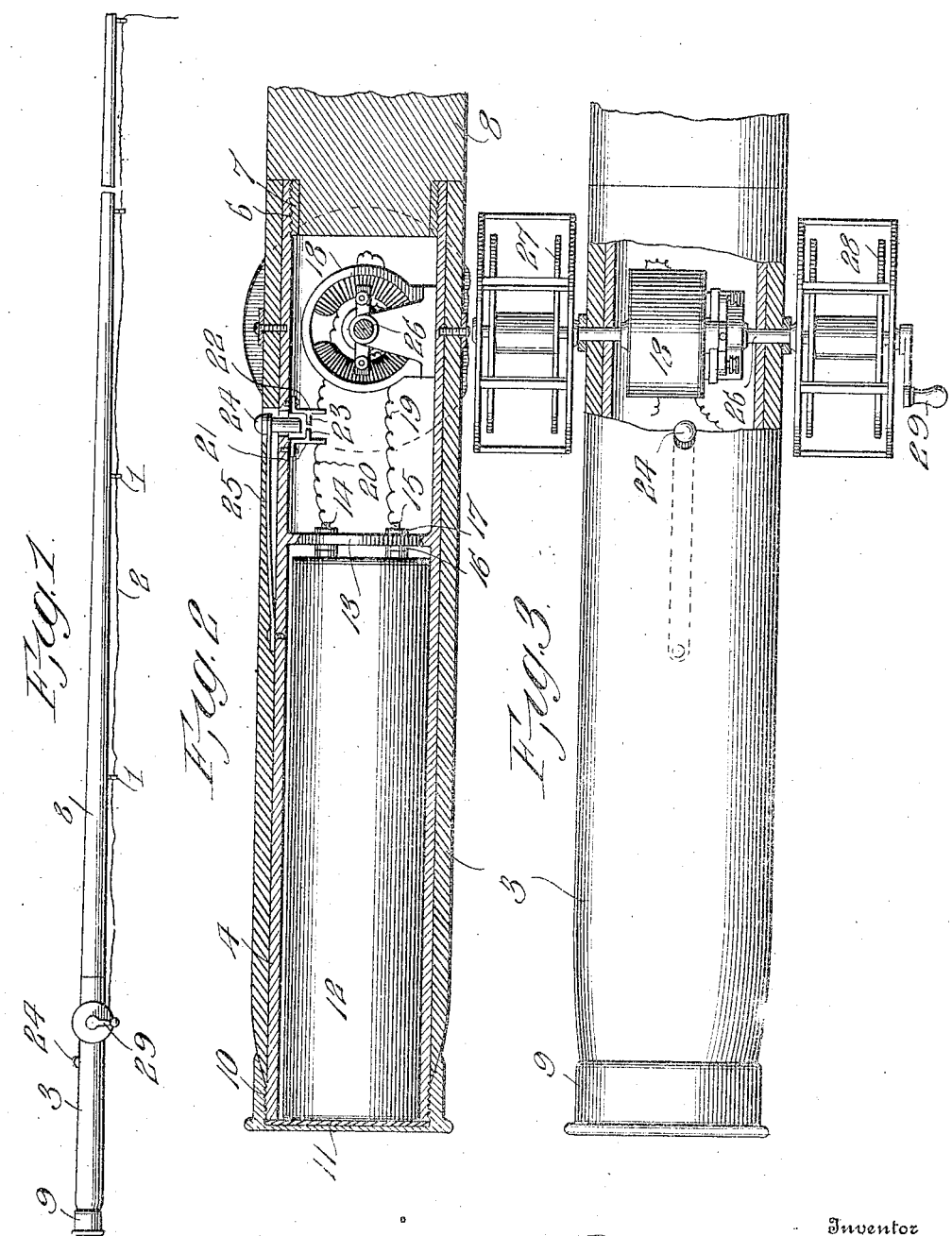
Witnesses
Frank Hough
R. M. Smith
Inventor
Paul Piper,
By Victor J. Evans.
Attorney

UNITED STATES PATENT OFFICE.

PAUL PIPER, OF LADYSMITH, WISCONSIN.

FISHING-POLE.

No. 902,447.

Specification of Letters Patent.

Patented Oct. 27, 1908.

Application filed May 8, 1908. Serial No. 431,672.

*To all whom it may concern:*

Be it known that I, PAUL PIPER, a citizen of the United States, residing at Ladysmith, in the county of Rusk and State of Wisconsin, have invented new and useful Improvements in Fishing-Poles, of which the following is a specification.

This invention relates to fishing poles, the object in view being to provide a fishing pole embodying a removable handle section having mounted thereon a line winding reel, and having inclosed therein electrically operated means for imparting rotary motion to the reel, combined with means for throwing the electrical connections into and out of operation, whereby the line will be automatically wound upon the reel without any special attention on the part of the operator who has only to press the button to throw the electrical apparatus into operation.

With the above and other objects in view, the invention consists in the novel construction, combination and arrangement of parts as herein fully described, illustrated and claimed.

In the accompanying drawings:—Figure 1 is a side elevation of a fishing rod or pole embodying the present invention. Fig. 2 is an enlarged longitudinal section through the handle portion of the pole, showing the electric motor and connections, and the manner of mounting the same therein. Fig. 3 is a plan view of the handle portion of the pole partly broken away in section and showing a plurality of reels mounted on the motor shaft.

The fishing rod or pole may be of any suitable length and may comprise any desired number of sections provided with eyes 1 to receive the fishing line shown at 2. The pole comprises essentially a removable handle section 3 which is hollow and within which is arranged a hollow or tubular core 4 around which the handle 3 is secured by means of screws or their equivalent which pass through the handle section into the core 4 as shown in Fig. 2. The core is internally screw threaded at one end as shown at 6 adapting the same to be secured tightly upon a threaded metal thimble 7 which is mounted fast on the reduced end of the adjoining pole or rod section 8 as clearly shown in Fig. 2.

At its opposite end the core 4 is closed by means of a flanged core cap 9 which is threaded upon the adjacent end of the core, as shown at 10 and provided on its inner face with a packing disk 11 against which abuts the adjacent end of a dry cell battery 12. Adjacent to the opposite end of the battery cell 12 the core 4 is provided with a cross piece 13 through which the poles 14 and 15 of the battery project, the same being securely fastened to the cross piece 13 by means of nuts 16 and 17 bearing against opposite sides of the cross piece 13 which should consist of some insulating material so as to prevent transmission of current to the core 4 which is preferably of metal.

Arranged in the space between the cross piece 13 and the adjacent pole section 8 is an electric motor 18 one of the wires of which leads to one of the poles 15 of the battery while the remaining wire 20 leads to the other pole 14 of the battery. One of the wires 20 however, is interrupted or broken and the ends thereof are connected to contact faces 21 and 22 having inwardly projecting contact fingers 23 with which the shank of a push button 24 is adapted to come in contact to bridge said fingers and close the circuit. The button 24 is carried by a spring 25 housed within the handle as shown in Fig. 2 and exerting its tension to hold the shank of the button out of contact with the fingers 23 thus breaking the circuit, the circuit being held normally open.

The shaft 26 of the motor projects through diametrically opposite bearings in the core and handle and is provided at its opposite ends with reels 27 and 28, one of which is preferably provided with a mechanical operating handle 29 to enable the operator to wind the reel by hand should the strength of the battery 12 become depleted.

As soon as a fish is caught upon the hook, the operator simply presses inward on the button 24 which completes the electrical circuit and sets the motor 18 in operation, the motor thus revolves the reels 27 and 28 and winds up the line or lines fastened thereto thus preserving a constant tension on the line which will be found particularly effective in landing a fish.

I claim:—

1. A fishing pole comprising a hollow handle, a reel having the shaft thereof journaled in the handle, and passing transversely therethrough, an electric motor associated with the reel shaft, a battery mounted in the handle and electrically connected with said motor, and a switch for throwing the motor into and out of operation, said switch being interposed in one of the current wires and embodying disconnected contact points, and a spring sustained button adapted to be moved into and out of contact with said points, substantially as described.

2. A fishing pole comprising a hollow handle, a reel having the shaft thereof entering said hollow handle, a hollow core mounted within the handle, an electric motor mounted within said core on the shaft of the reel, a cross piece within the core, a battery having the poles thereof passing through said cross piece, current wires passing from the poles of the battery to the motor, and a finger operated circuit closer arranged for operation from the exterior surface of the handle, substantially as described.

3. A fishing pole comprising jointed sections one of which is provided with a threaded thimble and the other of which is internally threaded to screw upon said thimble, one section constituting the handle and being of hollow construction and embodying a hollow core, a battery contained within said core, an electric motor associated with said battery and also mounted in the core, a circuit closer operable from the exterior of the handle, and a reel mounted exteriorly on the handle and fast upon the shaft of the electric motor, substantially as described.

4. A fishing pole comprising jointed sections one of which is provided with a reduced end having a threaded metal thimble thereon, another section being in the form of a hollow handle and comprising an inner hollow core internally threaded to screw upon the said thimble, a flanged core cap at the opposite end of the handle section provided with a packing disk on its inner face, a cross bar extending within the core, a battery interposed between said cross bar and the core cap, an electric motor arranged at the opposite side of the cross bar and electrically connected with the battery, a circuit closer operable from the exterior of the handle, and a reel mounted at one side of the handle and fast on the shaft of the motor, substantially as described.

In testimony whereof I affix my signature in presence of two witnesses.

PAUL PIPER.

Witnesses:
 DAVID BOGUE,
 S. C. SHAW.